(12) United States Patent
Fischer et al.

(10) Patent No.: US 8,835,535 B2
(45) Date of Patent: Sep. 16, 2014

(54) AQUEOUS DISPERSIONS OF SILICA FOR INCREASING EARLY STRENGTH IN CEMENTITIOUS PREPARATIONS

(75) Inventors: Ulrich Fischer, Moembris (DE); Philipp Wieland, Munich (DE); Christian Huebsch, Gmund (DE); Harald Grassl, Feichten an der Alz (DE); Kerstin Becher, Waldhausen (DE); Stefanie Scheul, Trostberg (DE); Eva Jetzlsperger, Unterneukirchen (DE)

(73) Assignees: Evonik Degussa GmbH, Essen (DE); Construction Research & Technology GmbH, Trostberg (DE)

( * ) Notice: Subject to any disclaimer, the term of this patent is extended or adjusted under 35 U.S.C. 154(b) by 1231 days.

(21) Appl. No.: 12/446,333

(22) PCT Filed: Oct. 16, 2007

(86) PCT No.: PCT/EP2007/061039
§ 371 (c)(1),
(2), (4) Date: Sep. 1, 2009

(87) PCT Pub. No.: WO2008/046831
PCT Pub. Date: Apr. 24, 2008

(65) Prior Publication Data
US 2010/0324173 A1    Dec. 23, 2010

(30) Foreign Application Priority Data
Oct. 20, 2006  (DE) .................. 10 2006 049 524

(51) Int. Cl.
*C08J 3/00*  (2006.01)
*C04B 14/06*  (2006.01)
*C04B 40/00*  (2006.01)

(52) U.S. Cl.
CPC ........... *C04B 14/062* (2013.01); *C04B 40/0039* (2013.01)
USPC ............... 523/351; 524/5; 524/457; 524/493; 524/558

(58) Field of Classification Search
USPC ................. 523/351; 524/5, 493, 558, 457
See application file for complete search history.

(56) References Cited

U.S. PATENT DOCUMENTS

| | | | |
|---|---|---|---|
| 5,362,582 A * | 11/1994 | Chang et al. | 429/249 |
| 5,814,145 A | 9/1998 | Dugat et al. | |
| 6,087,418 A * | 7/2000 | Yamashita et al. | 524/5 |
| 6,383,653 B1 * | 5/2002 | Vaidya | 428/511 |
| 6,521,699 B2 * | 2/2003 | Feder et al. | 524/588 |
| 6,767,399 B2 * | 7/2004 | Peev et al. | 106/808 |
| 8,093,326 B2 * | 1/2012 | Mosquet et al. | 524/423 |
| 2002/0014187 A1 | 2/2002 | Greenwood et al. | |
| 2002/0112650 A1 | 8/2002 | Prat et al. | |
| 2004/0039088 A1 | 2/2004 | Greenwood et al. | |
| 2006/0107874 A1 | 5/2006 | Castaing et al. | |
| 2006/0264565 A1 * | 11/2006 | Dietrich et al. | 524/558 |

FOREIGN PATENT DOCUMENTS

| | | |
|---|---|---|
| CN | 1436158 A | 8/2003 |
| CN | 1436158 A | 8/2003 |
| EP | 0 492 146 | 7/1992 |
| EP | 0 673 897 | 9/1995 |
| EP | 1189955 B1 | 3/2002 |
| FR | 2 841 549 | 1/2004 |
| JP | 61 117143 | 6/1986 |
| JP | 2 157145 | 6/1990 |
| JP | 2000 281412 | 10/2000 |
| JP | 2000-351820 A | 12/2000 |
| WO | WO 01/90024 A1 | 11/2001 |
| WO | 01 98227 | 12/2001 |
| WO | 2007 088111 | 8/2007 |

OTHER PUBLICATIONS

U.S. Appl. No. 12/446,365, filed Apr. 20, 2009, Fischer.
Japanese Office Action dated Aug. 8, 2012 in application No. 2009-532786.
Chinese Office Action issued Nov. 30, 2011 in patent application No. 200780047726.9 (English translation only).

* cited by examiner

*Primary Examiner* — Hannah Pak
(74) *Attorney, Agent, or Firm* — Oblon, Spivak, McClelland, Maier & Neustadt, L.L.P.

(57) ABSTRACT

Dispersion which is free of binders and which contains silica and at least one superplasticizer, the silica being a precipitated silica having a surface area greater than 50 $m^2/g$, the aggregates and/or agglomerates in the dispersion having a median diameter of less than 1 μm and the proportion of silica being from 5 to 50% by weight, based on the total amount of the dispersion, and a process for the preparation thereof and the use thereof as a concrete admixture in cement-containing preparations.

10 Claims, 1 Drawing Sheet

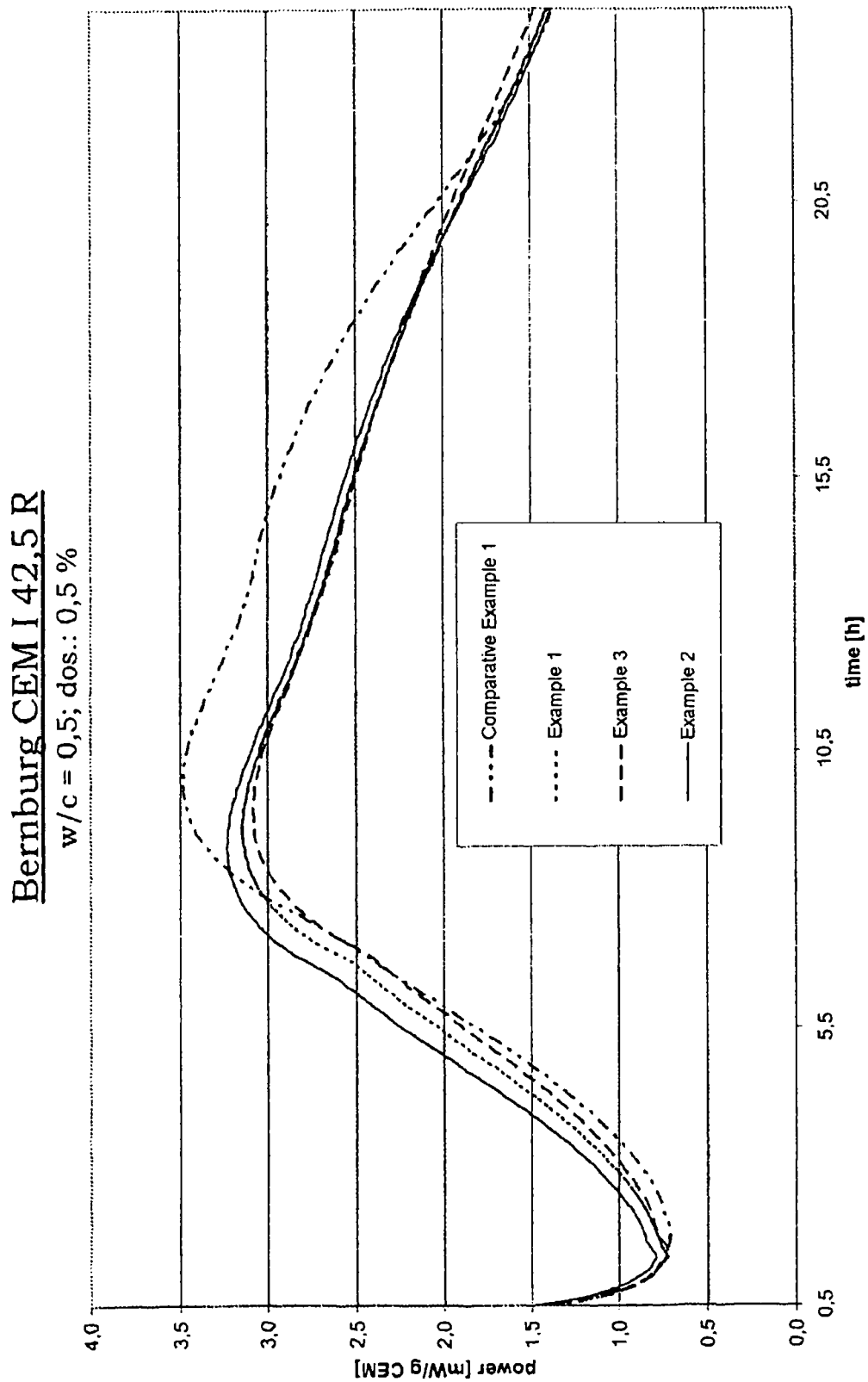

AQUEOUS DISPERSIONS OF SILICA FOR INCREASING EARLY STRENGTH IN CEMENTITIOUS PREPARATIONS

The invention relates to a dispersion based on silica and a superplasticizer, and the use thereof as a concrete admixture.

Two substantial criteria in the use of cementitious preparations are firstly the transportability thereof to the place of processing and secondly the duration required for this preparation to reach a strength which permits further processing or processing. This duration is also described in the literature as early strength and, in the context of the present text, is to be understood as meaning the strength of a cementitious preparation after <48 h of cement hydration.

It is known that the transportability can be influenced by the addition of so-called superplasticizers (cf. EP-A 214 412, German Patent 16 71 017, U.S. Pat. No. 5,707,445 B1, EP 1 110 981 A2, EP 1 142 847 A2).

It has also long been known, for example from U.S. Pat. No. 3,135,617, that an acceleration of setting can be achieved by addition of a finely divided amorphous silica to cementitious preparations. However, this did not become established since the processability of the fresh concrete was greatly limited thereby.

WO02/070429 discloses a composite material which contains inorganic aggregates, ultrafine particles, a cement-containing binder and a concrete superplasticizer. The composite material permits the production of a highly plasticized concrete in which no bleeding occurs. Ultrafine particles used are mainly "silica fume" particles which are obtained in relation to the production of silicon-metal. "Silica fume" particles show a strong filler effect in cement or concrete compositions but are not very reactive owing to their small specific surface area. Clay, fly ash, puzzolana, calcium carbonate, alumina, barium sulfate and titanium dioxide may be used as further particles of this order of magnitude. Said particles have the disadvantage that they have too low nucleation rates of the solids-forming phases and hence lead to low early strengths.

The proportion of the ultrafine particles, based on the total amount of the composite material, is from 1 to 30% by weight or from about 10 to 25% by weight in the working examples, based on the sum of cement and ultrafine particles. The required proportion of ultrafine particles is therefore very high.

U.S. Pat. No. 6,752,866 discloses a method for improving the early strength, in which an aqueous dispersion which contains a mineral filler and a specific dispersant is added to cement. Mineral fillers which may be used are calcium carbonate, barium carbonate, limestone, dolomite, talc, silica, titanium dioxides, kieselguhr, iron oxide, manganese oxide oxide, lime, kaolin, clay, mica, gypsum, fly ash, slag, calcium sulfate, zeolites, basalt, barium sulfate or aluminum trihydroxide. Calcium carbonate is preferably used. The disclosed, mean particle diameters of the mineral fillers used are in the range from about 2 to about 10 μm. What is important for the invention disclosed in U.S. Pat. No. 6,752,866 is a specific dispersant. This contains a copolymer which is obtained by free radical copolymerization of an alkoxypolyalkylene glycol-urethane with an anionic or nonionic monomer. No specific information on the required amounts of mineral filler, dispersant and cement is given. From the working examples, it is evident that the proportion of mineral filler is 10% by weight (silica, test number 12) or 30% by weight (silica, test number 17) and the proportion of dispersant is 0.5 (test number 17) or 0.75% by weight (test number 12), based on silica. These dispersions show only little stability to sedimentation.

WO01/90024 discloses a concrete composition which contains aggregates, a hydraulic binder, silica sol and a polycarboxylate. The BET surface area of the silica sol is preferably from 300 to 900 $m^2/g$. Silica sols are individual particles having a diameter of from 3 to 50 nm and are stable only in dispersions. WO01/90024 discloses nothing about the influence of the silica sol described on the early strength. However, it is known to the person skilled in the art that, at silica sol concentrations at which a significant increase in the early strength is achieved, the processability is also substantially reduced, so that large amounts of superplasticizer are necessary. It is presumed that this is because silica sols rapidly dissolve in the strongly alkaline cement or concrete compositions. The silica sols are therefore available only in a small amount as a nucleus for the formation of the solids-forming calcium silicate hydrate phases.

In Wiss. Z. Hochsch. Archit. Bauwesen.—Weimar 40 (1990), page 183, Wagner and Hauck show that the sequence of addition of the various constituents in the preparation of a concrete has a substantial influence on the early strength and the superplasticizer requirement if oxides which increase early strength are used. In the investigation, the oxide was added separately from the superplasticizer.

U.S. Pat. No. 5,030,286 describes 40-60% strength dispersions at pH 4-8.5 with a mean particle diameter of from 0.3 to 3 μm. It is evident from the patent examples that the dispersions are stable only when they are at least gently stirred or dispersants are used for stabilization.

U.S. Pat. No. 6,761,867 mentions dispersions having a median particle size $d_{50}$ of less than 5 μm. However, the patent examples show only dispersions whose mean particle size is in the μm range. The deagglomeration is effected here at pH<4. Here too, dispersants are added in some cases. Furthermore, in the case of the dispersions according to U.S. Pat. No. 6,761,867, a visible increase in the viscosity is found after storage for only 10 days.

The prior art shows that there is keen interest in developing concrete compositions which have high early strength in combination with good processability without having to use large amounts of superplasticizer. The prior art furthermore shows that the currently available superplasticizers and particles in the cement composition or concrete composition constitute a sensitive system. Thus, for example, the sequence of addition and the concentration of the starting materials have a decisive influence on the processability and the early strength of the concrete.

It is therefore an object of the invention to provide a concrete admixture and a process for its preparation, by means of which the disadvantages of the prior art can be minimized. In particular, the concrete admixture should substantially increase the early strength of concretes with simultaneously good processability.

The invention relates to dispersions, a process for their preparation and their use as defined and described in the claims, the description and the examples of the present application.

The present invention relates in particular to dispersions characterized in that
  they contain at least one precipitated silica and/or one silicate and at least one superplasticizer,
  the at least one precipitated silica and/or one silicate has a BET surface area greater than 50 $m^2/g$,
  the aggregates and/or agglomerates of the precipitated silica and/or silicate in the dispersion have a median diameter of less than 1 μm and
  the proportion of silica is from 5 to 50% by weight, based on the total amount of the dispersion.

The invention furthermore relates to a process for the preparation of the dispersion according to the invention, in which a) a superplasticizer in the form of a powder or as an aqueous solution of the superplasticizer is added with stirring to an aqueous starting dispersion of silica in which the aggregates and/or agglomerates have a median diameter of less than 1 µm and a BET surface area greater than 50 m²/g, and optionally further dilution is effected with water or b) a precipitated silica powder is dispersed in an aqueous solution of a superplasticizer by means of a suitable dispersing unit and subsequently optionally further diluted with water or c) the silica powder is dispersed in an aqueous phase, preferably in water, and the resulting dispersion is then added to an aqueous solution of the superplasticizer. The mixing in of the dispersion can be effected in this case with very low shearing energy, for example by means of a propeller stirrer.

The invention furthermore relates to the use of the dispersion according to the invention as a concrete admixture.

The invention furthermore relates to a cement-containing preparation which contains the dispersion according to the invention.

The proportion of silica in the cement-containing preparation is preferably from 0.01 to <2% by weight, based on the cement.

The dispersions according to the invention are distinguished in that the early strength of concrete is improved.

The dispersions according to the invention combine silica and superplasticizer in a single composition, with the result that mixing during the concrete preparation is dispensed with, which leads to simplified and accelerated concrete preparation. Furthermore, the number of possible different sequences of addition in the preparation of concrete preparations is reduced thereby, which leads to a simplification of the process and to a reduction of the sources of error.

It was furthermore found that the dispersions according to the invention have a good storage stability. Without being tied to a certain theory, this very positive effect is based on the stabilizing interaction of the silica particles with the superplasticizer. In particular, it is the good storage stability itself which permits the commercial use of the dispersions.

Finally, in comparison with the respective separate use of silica powders and superplasticizers, the use of the dispersions according to the invention has the advantage of substantially better handling. Compared with powder products, the freedom from dust is improved and the metering simplified. Furthermore, in comparison with the use of the same pulverulent silica and the same superplasticizer, in each case separately, an improvement in the early strength of concrete is found as a result of the dispersions according to the invention.

In the present invention, the terms silica and silica particles designate the same substance. These are understood as meaning precipitated silicas and/or silicates. Precipitated silicas are particularly preferred.

The terms silica and precipitated silica are used synonymously. In all cases, they are to be understood as meaning precipitated silica as described, for example, in *Ullmann's Encyclopedia of Industrial Chemistry*, 5$^{th}$ edition, vol. A23, pages 642-647. In order to avoid straightforward repetitions, the content of this publication is hereby explicitly included in the subject matter and the description of the present invention. Precipitated silica may have BET surface areas of up to 800 m²/g and is obtained by reaction of at least one silicate, preferably one alkaline metal and/or alkaline earth metal silicate, with at least one acidifying agent, preferably at least one mineral acid. In contrast to silica gels (cf. *Ullmann's Encyclopedia of Industrial Chemistry*, 5$^{th}$ edition, vol. A23, pages 629-635), precipitated silicas consist not of a uniform three-dimensional SiO$_2$ network but of individual aggregates and agglomerates. A particular feature of precipitated silica is the high proportion of so-called internal surface area which is reflected in a very porous structure with micropores and mesopores.

Precipitated silicas differ from pyrogenic silicas, which are also referred to as aerosils (cf. *Ullmann's Encyclopedia of Industrial Chemistry*, 5th edition, vol. A23, pages 635-642). Pyrogenic silicas are obtained by means of flame hydrolysis from silicon tetrachloride. Owing to the completely different preparation process, pyrogenic silicas have, inter alia, a different surface character compared with precipitated silicas. This is expressed, for example, in the smaller number of silanol groups on the surface. The behavior of pyrogenic silicas and precipitated silicas and hence also their behavior in aqueous dispersions are determined mainly by the surface properties. They therefore cannot be compared with one another. Compared with pyrogenic silicas, precipitated silicas have, inter alia, the advantage that they are substantially more economical.

Silicates are described in *Ullmann's Encyclopedia of Industrial Chemistry*, 5$^{th}$ edition, vol. A23, pages 661-717. In order to avoid straightforward repetitions, the content of this publication is hereby explicitly included in the subject matter and the description of the present invention.

Silica sols are to be understood as meaning particles according to Winnacker, Küchler, 5$^{th}$ edition, volume 3, page 868. In contrast to silica sols, in which the silica particles are present as primary particles, the particles of the silica dispersions according to the invention are secondary particles, i.e. aggregated primary particles.

The dispersions according to the invention are preferably aqueous dispersions, i.e. at least one constituent, particularly preferably the main constituent, of the liquid phase is water, preferably deionized water. In addition to water and at least one silica, dispersions according to the invention additionally contain at least one superplasticizer in the liquid phase. In a particularly preferred embodiment, the dispersions according to the invention otherwise contain no further liquid additives, especially not those which prevent the sedimentation of the silica particles.

The dispersions according to the invention are preferably free of binders. Binders are to be understood as meaning inorganic substances, such as, for example, cement, or organic substances which are processable in the plastic state and harden in the course of a certain time and thus bind other substances to one another.

Furthermore, the dispersions according to the invention are preferably free of inorganic dispersants and mechanical stabilizers, such as, for example, latex.

It is furthermore possible for the dispersion according to the invention to contain the precipitated silica as the only solid. This may be expedient in particular when the dispersion is to serve as a masterbatch for various applications.

Preferably, the BET surface area of the silica present in the dispersion according to the invention is in the range of 50-800 m²/g, preferably 50-500 m² g, particularly preferably in the range of 100-400 m²/g, and very particularly preferably in the range of 150-250 m²/g in the case of a precipitated silica.

Preferably, the BET surface area of the silica present in the dispersion according to the invention is in the range of 50-800 m²/g, particularly preferably in the range of 50-500 m²/g, very particularly preferably in the range of 50-290 m²/g, in particular preferably in the range of 70-250 m²/g, and especially preferably 70-150 m²/g if it is a silicate.

If a plurality of silicas are to be present alongside one another in the dispersions according to the invention, the BET surface area is based on the total surface area which is formed by the silicas altogether. In this case, the BET is preferably in the range of in the range of 50-800 m²/g, particularly preferably 50-500 m² g, very particularly preferably in the range of 70-500 m²/g, and especially preferably in the range of 70-250 m²/g.

As a result of the influence of the internal surface area present in comparison with silica sols and of the increased external surface area, in comparison with microsilica, of the silicas present in the dispersion according to the invention, the early strength of the concrete preparations is substantially improved.

For the dispersion according to the invention, the following preferred ranges may be mentioned for the median diameter $d_{50}$ of the aggregates and/or agglomerates in the dispersion: from 50 to 900 nm, from 50 to 750 nm, from 100 to 500 nm and from 150 to 350 nm. Values below 50 nm can be realized technically only with difficulty and have no further advantages in the application. By reducing the median particle size in comparison with dispersions of the prior art, the storage stability of the dispersions according to the invention is substantially improved. At the same time, this results in a larger number of individual particles being present in the same amount by weight of silica, so that more nuclei are thus available for the formation of the strength-forming calcium silicate hydrate phases and hence the early strength of concrete preparations is further improved.

The proportion of precipitated silica in the dispersion according to the invention is from 5 to 50% by weight, based on the total amount of the dispersion. Dispersions according to the invention which have a silica content of from 10 to 50% by weight, preferably from 20 to 40% by weight, particularly preferably from 20 to 35% by weight, and very particularly preferably from 25 to 35% by weight show as a rule better stability than dispersions having a higher filler content. Dispersions having less than 5% by weight of silica are not economical owing to the high water content.

The dispersions according to the invention preferably have a pH of from 8 to 12, preferably from 8.5 to 10, particularly preferably from 8.8 to 10 and especially preferably from 9 to 10. It has in fact been found that the pH of the dispersions should not be too low. The pH of the dispersions according to the invention has in particular a stabilizing effect on the sedimentation properties of the dispersion.

The dispersion according to the invention contains at least one superplasticizer. Suitable plasticizers may be: ligninsulfonate, sulfonated naphthalene-formaldehyde polycondensates (cf. EP0214 412), sulfonated melamine-formaldehyde polycondensates (cf. DE1671017) and polycarboxylate ethers (cf. U.S. Pat. No. 5,707,445, EP1110981, EP1142847). The content of the patents cited is hereby explicitly incorporated into the content of the present application.

A preferred polycarboxylate ether is a water-soluble polycarboxylate ether in the form of a copolymer which is composed of polyoxyalkylene-containing structural building blocks and carboxylic acid and/or carboxylic anhydride monomers and optionally further monomers.

The superplasticizer/silica weight ratio in the dispersion according to the invention is from 0.01 to 100. This ratio may preferably be from 0.01 to 50, particularly preferably from 0.05 to 20, very particularly preferably from 0.01 to 10, in particular preferably 0.05-5, especially preferably from 0.1 to 1 and very especially preferably from 0.1 to 0.5.

The dispersion according to the invention may contain a copolymer having the structural groups a), b), c) preferably having the structural groups a), b), c) and d). The proportion of structural group a) is from 51 to 95 mol %, that of structural group b) is from 1 to 48.9 mol %, that of structural group c) is from 0.1 to 5 mol % and that of structural group d) is from 0 to 47.9 mol %.

The first structural group a) is a mono- or dicarboxylic acid derivative having the general Formula Ia, Ib or Ic.

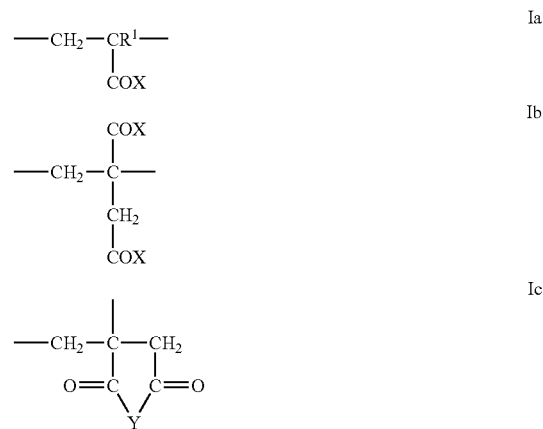

In the monocarboxylic acid derivative Ia, $R^1$ is hydrogen or an aliphatic hydrocarbon radical having 1 to 20 C atoms, preferably a methyl group. X in the structures Ia and Ib is —$OM_a$ and/or —O—$(C_mH_{2m}O)_n$—$R^2$ or —NH—$(C_mH_{2m}O)_n$—$R^2$ with the following meaning for M, a, m, n and $R^2$:

M is hydrogen, a monovalent or divalent metal cation, ammonium, an organic amine radical and a=½ or 1, depending on whether M is a monovalent or divalent cation. Preferably used organic amine radicals are substituted ammonium groups which are derived from primary, secondary or tertiary $C_{1-20}$-alkylamines, $C_{1-20}$-alkanolamines, $C_{5-8}$-cycloalkylamines and $C_{8-14}$-arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^2$ is hydrogen, an aliphatic hydrocarbon radical having 1 to 20 C atoms, a cycloaliphatic hydrocarbon radical having to 8 C atoms, an aryl radical having 6 to 14 C atoms which may optionally also be substituted, m may be from 2 to 4 and n may be from 0 to 200. Here, the aliphatic hydrocarbons may be linear or branched and saturated or unsaturated. Cyclopentyl or cyclohexyl radicals are to be regarded as preferred cycloalkyl radicals, and phenyl or naphthyl radicals as preferred aryl radicals, which in particular may also be substituted by hydroxyl, carboxyl or sulfo groups.

Instead of or in addition to the dicarboxylic acid derivative according to Formula Ib, the structural group a) (mono- or dicarboxylic acid derivative) may also be present in cyclic form corresponding to Formula Ic, where Y may be (acid anhydride) or $NR^2$ (acid imide), with the meaning designated above for $R^2$.

The second structural group b) corresponds to Formula II

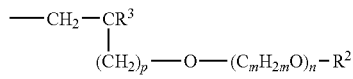
II and is derived from oxyalkylene glycol alkenyl ethers in which m, n and $R^2$ have the meaning designated above. $R^3$ is once again hydrogen or an aliphatic hydrocarbon radical having 1 to 5 C atoms, which may likewise be linear or branched or unsaturated. p may assume values between 0 and 3.

According to the preferred embodiments, m=2 and/or 3 in the Formulae Ia, Ib and II, resulting in polyalkylene oxide groups which are derived from polyethylene oxide and/or polypropylene oxide. In a further preferred embodiment, p in Formula II is 0 or 1, i.e. resulting in vinyl and/or alkyl polyalkoxylates.

The third structural group c) corresponds to the Formula IIIa or IIIb

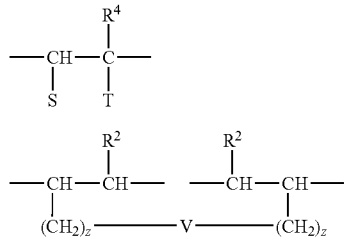
IIIa

IIIb

In Formula IIIa, $R^4$ may be H or $CH_3$, depending on whether acrylic or methacrylic acid derivatives are present. Here, S may be —H, —$COOM_a$ or —$COOR^5$, where a and M have the abovementioned meaning and $R^5$ may be an aliphatic hydrocarbon radical having 3 to 20 C atoms, a cycloaliphatic hydrocarbon radical having 5 to 8 C atoms or an aryl radical having 6 to 14 C atoms. The aliphatic hydrocarbon radical may likewise be linear or branched, saturated or unsaturated. The preferred cycloaliphatic hydrocarbon radicals are once again cyclopentyl or cyclohexyl radicals and the preferred aryl radicals phenyl or naphthyl radicals. If T is —$COOR^5$, S is $COOM_a$ or —$COOR^5$. Where T and S are =$COOR^5$, the corresponding structural groups are derived from the dicarboxylic esters.

In addition to these ester structural units, the structural groups c) may have yet other hydrophobic structural elements. These include the polypropylene oxide or polypropylene oxide-polyethylene oxide derivative with

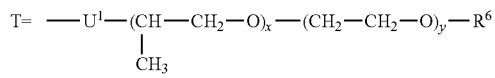

Here, x assumes a value of from 1 to 150 and y a value of from 0 to 15. Here, the polypropylene oxide(-polyethylene oxide) derivatives may be linked via a group $U^1$ to the ethyl radical of the structural group c) according to Formula IIIa, it being possible for $U^1$ to be —CO—NH—, —O— or —$CH_2$—O—. These are the corresponding amide, vinyl and allyl ethers of the structural group corresponding to Formula IIIa. Here, $R^6$ may once again be $R^2$ (for meaning of $R^2$, see above) or

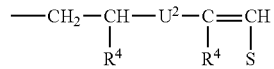

where $U^2$ may be —NH—CO—, —O—, or —$OCH_2$— and S has the meaning described above. These compounds are polypropylene oxide(-polyethylene oxide) derivatives of the bifunctional alkenyl compounds corresponding to Formula IIIa.

As a further hydrophobic structural element, the compounds corresponding to Formula IIIa may contain polydimethylsiloxane groups, which corresponds to T=—W—$R^7$ in the Formula IIIa.

Here, W is

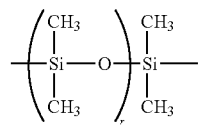

(referred to below as polydimethylsiloxane group), $R^7$ may be $R^2$, and r may assume values from 2 to 100 here.

The polydimethylsiloxane group cannot only be bonded directly to the ethylene radical according to Formula IIIa but also via the groups —CO—[NH—$(CH_2)_3$]$_s$—W—$R^7$ or —CO—O$(CH_2)$$_z$—W—$R^7$, where $R^7$ is preferably $R^2$, and s may be 1 or 2 and z may be from 0 to 4. $R^7$ may also be

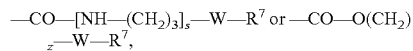

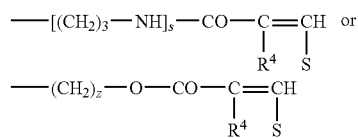

These are the corresponding difunctional ethylene compounds corresponding to the Formula IIIa, which are linked to one another via the corresponding amide or ester groups, only one ethylene group having been copolymerized.

The compounds according to Formula IIIa with T=$(CH_2)_z$—V—$(CH_2)_z$—CH=CH—$R^2$, where z=from 0 to 4, V may be either a polydimethylsiloxane radical W or a —O—CO—$C_6H_4$—CO—O— radical and $R^2$ has the abovementioned meaning, are similar. These compounds are derived from the corresponding dialkenylphenyldicarboxylic esters or dialkenylpolydimethylsiloxane derivates.

It is also possible within the scope of the present invention that not only one ethylene group but both ethylene groups of the difunctional ethylene compounds have been copolymerized. This corresponds substantially to the structural groups corresponding to the Formula IIIb

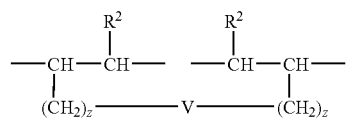
IIIb where $R^2$, V and z have the meaning already described.

The fourth structural group d) is derived from an unsaturated dicarboxylic acid derivative of the general Formula IVa and/or IVb having the abovementioned meaning for a, M, X and Y.

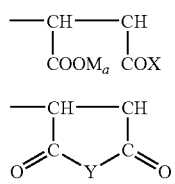

Preferably, the copolymers contain from 55 to 75 mol % of structural groups of the Formula Ia and/or Ib, from 19.5 to 39.5 mol % of structural groups of the Formula II, from 0.5 to 2 mol % of structural groups of the Formula IIIa and/or IIIb and from 5 to 20 mol % of structural groups of the Formula IVa and/or IVb.

According to a preferred embodiment, the copolymers according to the invention additionally contain up to 50 mol %, in particular up to 20 mol %, based on the sum of the structural groups a to d, of structures which are based on monomers based on vinyl or (meth)acrylic acid derivatives, such as styrene, methylstyrene, vinyl acetate, vinyl propionate, ethylene, propylene, isobutene, hydroxyalkyl (meth) acrylates, acrylamide, methacrylamide, N-vinylpyrrolidone, allylsulfonic acid, methallylsulfonic acid, vinylsulfonic acid, vinylphosphonic acid, AMPS, methyl methacrylate, methyl acrylate, butyl acrylate, allylhexyl acrylate, etc.

The number of repeating structural units in the copolymers is not limited. However, it has proven particularly advantageous to establish average molecular weights from 1000 to 100 000 g/mol.

The preparation of the copolymers can be effected in various ways. What is important here is that from 51 to 95 mol % of an unsaturated mono- or dicarboxylic acid derivative, from 1 to 48.9 mol % of an oxyalkylene alkenyl ether, from 0.1 to 5 mol % of a vinylic polyalkylene glycol, polysiloxane or ester compounds and from 0 to 55 mol % of a dicarboxylic acid derivative are polymerized with the aid of a free radical initiator.

The following are preferably used as unsaturated mono- or dicarboxylic acid derivatives which form the structural groups of the Formulae Ia, Ib or Ic: acrylic acid, methacrylic acid, itaconic acid, itaconic anhydride, itaconimide and itaconic acid monoamide.

Instead of acrylic acid, methacrylic acid, itaconic acid and itaconic acid monoamide, the monovalent or divalent metal salts thereof, preferably sodium, potassium, calcium or ammonium salts, can also be used.

In particular, derivatives whose alcoholic component a polyalkylene glycol of the general Formula HO—$(C_mH_{2m}O)_n$—$R^2$ with $R^2$=H, aliphatic hydrocarbon radical having 1 to 20 C atoms, cycloaliphatic hydrocarbon radical having 5 to 8 C atoms, optionally substituted aryl radical having 6 to 14 C atoms and m=from 2 to 4 and n=from 0 to 200 are used as acrylic, methacrylic or itaconic esters.

The preferred substituents on the aryl radical are —OH—, —COO— or —$SO_3$— groups.

The unsaturated monocarboxylic acid derivatives may be present only as monoesters whereas diester derivatives are also possible in the case of dicarboxylic acid itaconic acid.

The derivatives of the Formulae Ia, Ib and Ic may also be present as a mixture of esterified and free acids and are used in an amount of, preferably, from 55 to 75 mol %.

The second component for the preparation of the copolymers according to the invention is an oxyalkylene glycol alkenyl ether, which is preferably used in an amount of from 19.5 to 39.5 mol %. In the preferred oxyalkylene glycol alkenyl ethers corresponding to the Formula V

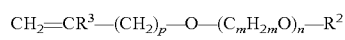

$R^3$ is H or an aliphatic hydrocarbon radical having from 1 to 5 C atoms and p is from 0 to 3. $R^2$, m and n have the meaning already mentioned above. The use of polyethylene glycol monovinyl ether (p=0 and m=2) has proven particularly advantageous here, n preferably having values from 1 to 50.

Preferably from 0.5 to 2 mol % of a vinylic polyalkylene glycol, polysiloxane or ester compound is used as a third component for introducing the structural group c).

Preferably used vinylic polyalkylene glycol compounds are derivatives corresponding to the Formula VI

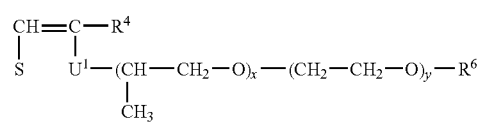

where S can preferably be —H, or $COOM_a$ and $U^1$ may be —CO—NH—, —O— or —$CH_2O$—, i.e. the acid amide, vinyl or allyl ether of the corresponding polypropylene glycol or polypropylene glycol-polyethylene glycol derivatives. Values for x are from 1 to 150 and for y from 0 to 15. $R^6$ may either once again be $R^1$ or

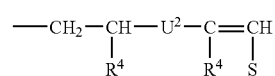

where $U^2$ is —NH—CO—, —O— and —$OCH_2$— and S is —$COOM_a$ and preferably —H.

Where $R^6$ is $R^2$ and $R^2$ is preferably H, these are the polypropylene glycol (-polyethylene glycol) monoamides or ethers of the corresponding acrylic acid (S=H, $R^4$=H), methacrylic acid (S=H, $R^4$=$CH_3$) or maleic acid (S=$COOM_a$, $R^4$=H) derivatives. Examples of such monomers are maleic acid N-(methylpolypropylene glycol) monoamide, maleic acid N-(methoxypolypropylene glycol-polyethylene glycol) monoamide, polypropylene glycol vinyl ether and polypropylene glycol allyl ether.

Where $R^6 \neq R^2$, these are bifunctional vinyl compounds whose polypropylene glycol (-polyethylene glycol) derivatives are linked to one another via amide or ether groups (—O— or —$OCH_2$—). Examples of such compounds are polypropylene glycol bismaleamic acid, polypropylene glycol diacrylamide, polypropylene glycol dimethacrylamide, polypropylene glycol divinyl ether, polypropylene glycol diallyl ether.

Derivatives corresponding to the Formula VII

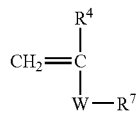

VII where $R^4 = $ —H or $CH_3$,

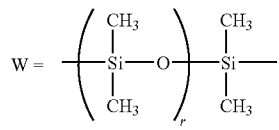

and r is from 2 to 100 and $R^7$ is preferably $R^1$, are used as a preferred vinylic polysiloxane compound. Examples of such monomers are monovinylpolydimethylsiloxanes.

Derivatives corresponding to the Formula VIII

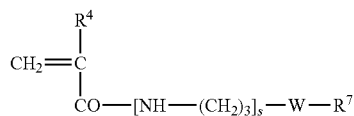

VIII where s may be 1 or 2, $R^4$ and W have the above-mentioned meaning and $R^7$ may either be $R^2$ or

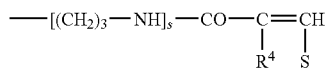

and S is preferably hydrogen, are suitable as a further vinylic polysiloxane compound.

Examples of such monomers having a vinyl function ($R^7 = R^2$) are polydimethylsiloxanepropylmaleamic acid or polydimethylsiloxanedipropyleneaminomaleamic acid. Where $R^7 \neq R^2$, these are divinyl compounds, such as, for example, polydimethylsiloxanebis(propylmaleamic acid) or polydimethylsiloxanebis(dipropyleneaminomaleamic acid).

A suitable further vinylic polysiloxane compound is a preferred derivative corresponding to the formula:

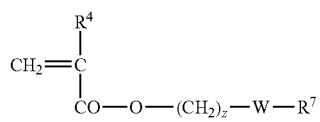

IX where z may be from 0 to 4 and $R^4$ or W have the abovementioned meaning. $R^7$ may be either $R^2$ or

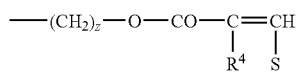

where S is preferably hydrogen. Examples of such monovinylic compounds ($R^7 = R^1$) are polydimethylsiloxane-(1-propyl-3-acrylate) or polydimethylsiloxane-(1-propyl-3-methacrylate).

Where $R^7 \neq R^2$, these are divinyl compounds, such as, for example, polydimethylsiloxanebis-(1-propyl-3-acrylate) or polydimethylsiloxanebis-(1-propyl-3-methacrylate).

In the context of the present invention, derivatives corresponding to the Formula X

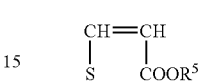

X where S is $COOM_a$ or —$COOR^5$ and $R^5$ may be an aliphatic hydrocarbon radical having 3 to 20 C atoms, a cycloaliphatic hydrocarbon radical having 5 to 8 C atoms and an aryl radical having 6 to 14 C atoms, are preferably used as the vinylic ester compound. a and M have the abovementioned meaning. Examples of such ester compounds are di-n-butyl maleate or fumarate or mono-n-butyl maleate or fumarate.

Furthermore, compounds corresponding to the Formula XI may also be used

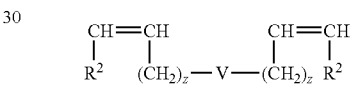

XI where z once again may be from 0 to 4 and $R^2$ has the meaning already known. Here, V may be W (i.e. a polydimethylsiloxane group), which corresponds to a dialkenylpolydimethylsiloxane compound, such as, for example, divinylpolydimethylsiloxane. As an alternative to this, V may also be —O—CO—$C_6H_4$—CO—O—. These compounds are dialkenylphthalic acid derivatives. A typical example of such phthalic acid derivatives is diallyl phthalate.

The molecular weights of the compounds which form the structural group c) can be varied within wide limits and are preferably from 150 to 10 000.

Preferably from 5 to 20 mol % of an unsaturated dicarboxylic acid derivative (XII):

XII having the meaning already mentioned for a, M and x can be used as the fourth component for the preparation of the copolymers.

Where $X = OM_a$, the unsaturated dicarboxylic acid derivative is derived from maleic acid, fumaric acid, mono- or divalent metal salts of these dicarboxylic acids, such as the sodium, potassium, calcium or ammonium salt, or salts having an organic amine radical. Additionally used monomers which form the unit Ia are polyalkylene glycol monoesters of the abovementioned acids having the general Formula XIII:

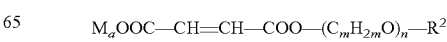

having the meaning already mentioned for a, m, n and $R^2$.

The fourth component may also be derived from the unsaturated dicarboxylic anhydrides and imides of the general Formula XIV (from 5 to 20 mol %)

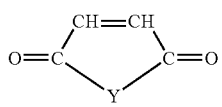

XIV having the abovementioned meaning for Y.

According to the invention, according to a preferred embodiment, up to 50, preferably up to 20, mol %, based on the sum of the structural groups a) to d), of further monomers as described above can also be used.

The dispersion according to the invention may furthermore contain a copolymer whose basis is an oxyalkenyl glycol alkenyl ether and the copolymer contains the structural groups a), b) and c). The proportion of the structural group a) is from 10 to 90 mol %, that of the structural group b) from 1 to 89 mol %, that of the structural group c) from 0.1 to 5 mol % and that of the structural group d) from 0.1 to 10 mol %.

The first structural group a) is an unsaturated dicarboxylic acid derivative corresponding to the Formula IVa or IVb.

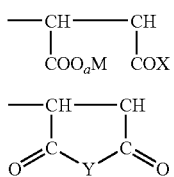

In the dicarboxylic acid derivative corresponding to Formula Id, M is hydrogen, a mono- or divalent metal cation, an ammonium ion, an organic amine radical, and a=1, or, where M is a divalent cation, a ½. Together with a group likewise containing $M_a$ with a=½, a bridge via M then results, which exists only theoretically as $M_a$ with a=½.

Sodium, potassium, calcium or magnesium ions are preferably used as the mono- or divalent metal cation. Preferably used organic amine radicals are substituted ammonium groups which are derived from primary, secondary or tertiary $C_1$- to $C_{20}$-alkylamines, $C_1$- to $C_{20}$-alkanolamines, $C_5$- to $C_8$-cycloalkylamines and $C_6$- to $C_{14}$-arylamines. Examples of corresponding amines are methylamine, dimethylamine, trimethylamine, ethanolamine, diethanolamine, triethanolamine, cyclohexylamine, dicyclohexylamine, phenylamine, diphenylamine in the protonated (ammonium) form. In addition, X is also —$OM_a$ or —O— $(C_mH_{2m}O)_n$—$R^1$ where $R^1$ may be H, an aliphatic hydrocarbon radical having 1 to 20 C atoms, a cycloaliphatic hydrocarbon radical having 5 to 8 C atoms, an aryl radical having 6 to 14 C atoms, which may optionally also be substituted, m may be from 2 to 4 and n may be from 0 to 200. Here, the aliphatic hydrocarbon radicals may be linear or branched and saturated or unsaturated.

Cyclopentyl or cyclohexyl radicals are to be regarded as preferred cycloalkyl radicals and phenyl or naphthyl radicals, which in particular may also be substituted by hydroxyl, carboxyl or sulfo groups, are to be regarded as preferred aryl radicals. As an alternative to this, X may also be —$NHR^2$ and/or —$NR^2_2$, which corresponds to the mono- or disubstituted monoamides of the corresponding unsaturated dicarboxylic acid, where $R^2$ may once again be identical to $R^1$ or instead may be —CO—$NH_2$.

Instead of the dicarboxylic acid derivative corresponding to Formula IVa, the structural group a) (dicarboxylic acid derivative) may also be present in cyclic form corresponding to the Formula IVb, where Y may be O (=acid anhydride) or $NR^2$ (acid imide) and $R^2$ has the meaning designated above.

In the second structural group corresponding to the Formula II,

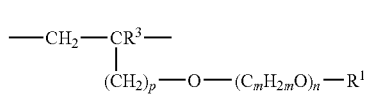

II which is derived from the oxyalkylene glycol alkenyl ethers, $R^3$ is once again hydrogen or an aliphatic hydrocarbon radical having 1 to 5 C atoms (which likewise may be linear or branched or unsaturated). p may assume values from 0 to 3 and $R^2$, m and n have the above-mentioned meaning. According to a preferred embodiment, p=0 and m=2 or 3 in Formula II, so that these are structural groups which are derived from polyethylene oxide or polypropylene oxide vinyl ethers.

The third structural group c) corresponds to the Formula IIIa or IIIb

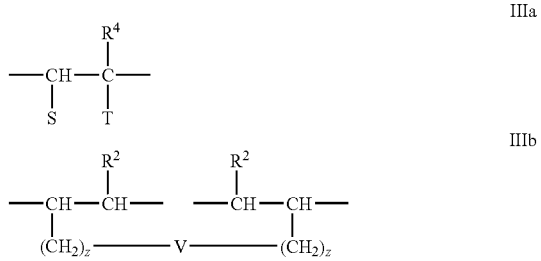

In Formula IIIa, $R^4$ may be H or $CH_3$, depending on whether acrylic or methacrylic acid derivatives are present. Here, S may be —H, $COOM_a$ or —$COOR^5$, where a and M have the abovementioned meaning and $R^5$ may be an aliphatic hydrocarbon radical having 3 to 20 C atoms, a cycloaliphatic hydrocarbon radical having 5 to 8 C atoms or an aryl radical having 6 to 14 C atoms. The aliphatic hydrocarbon radical may likewise be linear or branched, saturated or unsaturated. The preferred cycloaliphatic hydrocarbon radicals are once again cyclopentyl or cyclohexyl radicals and the preferred aryl radicals are phenyl or naphthyl radicals. Where T=—$COOR^5$, S is $COOM_a$ or —$COOR^5$. Where T and S are $COOR^5$, the corresponding structural groups are derived from the dicarboxylic esters.

In addition to these ester structural units, the structural groups c) may also have other hydrophobic structural elements. These include the polypropylene oxide or polypropylene oxide-polyethylene oxide derivatives with

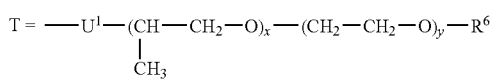

Here, x assumes a value from 1 to 150 and y a value from 0 to 15. The polypropylene oxide (-polyethylene oxide) derivatives can be linked here via a group $U^1$ to the ethyl radical of the structural group c) corresponding to Formula IIIa, where $U^1$ may be —CO—NH—, —O— or —$CH_2$—O—. These are the corresponding amide, vinyl or allyl ethers of the structural groups corresponding to Formula IIIa. Here, $R^6$ may once again be $R^1$ (for the meaning of $R^1$, see above) or

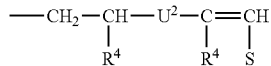

where $U^2$ may be —NH—CO—, —O— or —OCH$_2$— and S has the meaning described above. These compounds are polypropylene oxide (-polyethylene oxide) derivatives of the bifunctional alkenyl compounds corresponding to Formula IIIa.

As a further hydrophobic structural element, the compounds corresponding to Formula IIIa may contain polydimethylsiloxane groups, which corresponds to T—W—$R^7$ in the Formula IIIa.

Here, W is

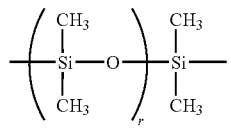

(referred to below as polydimethylsiloxane group), $R^7$ may be $R^1$ and r may assume values from 2 to 100 here.

The polydimethylsiloxane group W can be bonded to the ethylene radical according to Formula IIIa not only directly but also via the groups

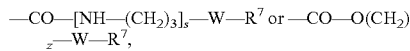

where $R^7$ is preferably $R^1$ and s may be 1 or 2 and z may be from 0 to 4.

$R^7$ may also be

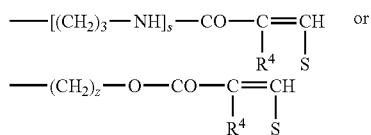

These are the corresponding difunctional ethylene compounds corresponding to the Formula IIIa, which are linked to one another via the corresponding amide or ester groups, only one ethylene group having been copolymerized.

A similar situation also applies to the compounds according to Formula IIIa with T=—(CH$_2$)$_z$—V—(CH$_2$)$_z$—CH=CH—$R^1$, where z=0 to 4, V may be either a polydimethylsiloxane radical W or a —O—CO—C$_6$H$_4$—CO—O— radical and $R^1$ has the above-mentioned meaning. These compounds are derived from the corresponding dialkenylphenyl-dicarboxylic esters or dialkenylpolydimethylsiloxane derivatives.

It is also possible within the scope of the present invention that not only one ethylene group but both ethylene groups of the difunctional ethylene compounds have been copolymerized. This corresponds substantially to the structural groups corresponding to Formula IIIb

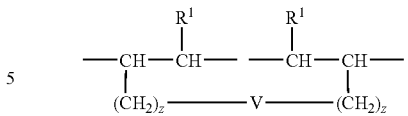

where $R^1$, V and z have the meaning already described.

These copolymers preferably consist of from 40 to 55 mol % of structural groups of the Formula IVa and/or IVb, from 40 to 55 mol % of structural groups of the Formula II and from 1 to 5 mol % of structural groups of the Formula IIIa or IIIb. According to a preferred embodiment, the copolymers additionally contain up to 50 mol %, in particular up to 20 mol %, based on the sum of the structural groups a), b) and c), of structural groups whose monomer is a vinyl, acrylic acid or methacrylic acid derivative.

The monomeric vinyl derivatives can preferably be from a compound which is selected from the group consisting of styrene, ethylene, propylene, isobutene or vinyl acetate. The additional structural groups are derived in particular from acrylic acid or methyl acrylate as a preferred monomeric acrylic acid derivative. Methacrylic acid, methyl methacrylate and hydroxyethyl methacrylate are to be regarded as a preferred monomeric methacrylic acid derivative.

The number of repeating structural elements of the copolymers is not limited here, but it has proven particularly advantageous to establish the number of structural elements so that the copolymers have an average molecular weight of from 1000 to 200 000.

The second component of the copolymers is an oxyalkylene glycol alkenyl ether, which is preferably used in an amount of from 40 to 55 mol %. In the case of the preferred oxyalkylene glycol alkenyl ethers corresponding to the Formula V $$CH_2=CR^3-(CH_2)_p-O-(C_mH_{2m}O)_n-R^1 \qquad V$$

$R^3$ is H or an aliphatic hydrocarbon radical having 1 to 5 C atoms and p is from 0 to 3. $R^1$, m and n have the meaning already mentioned above. The use of polyethylene glycol monovinyl ethers (p=0 and m=2) has proven particularly advantageous here, n preferably having values from 2 to 15.

From 1 to 5 mol % of a vinylic polyalkylene glycol, polysiloxane or ester compound is preferably used as the third component essential to the invention for introducing the structural groups c). Derivatives corresponding to the Formula VI

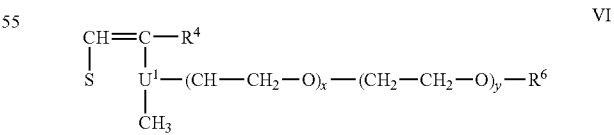

where S may preferably be —H or COOM$_a$ and $U^1$ may be —CO—NH—, —O— or —CH$_2$O—, are used as a preferred vinylic polyalkylene glycol compound, i.e. these are the acid amide, vinyl or allyl ethers of the corresponding polypropylene glycol or polypropylene glycol-polyethylene glycol derivatives.

The values for x are from 1 to 150 and those for y from 0 to 15. $R^6$ may either be once again $R^1$ or may be

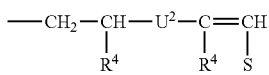

where $U^2$ is —NH—CO—, —O— and —OCH$_2$— and S is —COOM$_a$ and preferably —H.

Where $R^6$ is $R^1$ and $R^1$ is preferably H, the polypropylene glycol (-polyethylene glycol) monoamides or ethers of the corresponding acrylic acid (S=H, $R^4$=H), methacrylic acid (S=H, $R^4$=CH$_3$) or maleic acid (S=COOM$_a$, $R^4$=H) derivatives are present. Examples of such monomers are maleic acid N-(methylpolypropylene glycol) monoamide, maleic acid N-(methoxypolypropylene glycol-polyethylene glycol) monoamide, polypropylene glycol vinyl ether and polypropylene glycol allyl ether.

Where $R^6 \neq R^1$, bifunctional vinyl compounds whose polypropylene glycol (-polyethylene glycol) derivatives are linked to one another via amide or ether groups (—O— or —OCH$_2$—), respectively, are present. Examples of such compounds are polypropylene glycol bismaleamic acid, polypropylene glycol diacrylamide, polypropylene glycol dimethacrylamide, polypropylene glycol divinyl ether, polypropylene glycol diallyl ether.

Derivates corresponding to the Formula VII

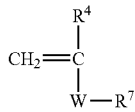

VII

Where $R^4$ is —H and CH$_3$,
W is

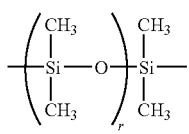

and r is from 2 to 100 and $R^7$ is preferably $R^1$ are used as preferred vinylic polysiloxane compound. Examples of such monomers are monovinylpolydimethylsiloxanes.

Derivatives corresponding to the Formula VIII

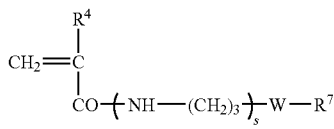

VIII where s may be 1 or 2, $R^4$ and W have the above-mentioned meaning and $R^7$ may be either $R^1$ or and S is preferably hydrogen, are suitable as a further vinylic polysiloxane compound.

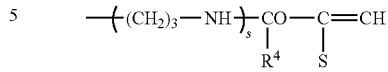

Examples of such monomers having a vinyl function ($R^7$=$R^1$) are polydimethylsiloxanepropylmaleamic acid or polydimethylsiloxanedipropyleneaminomaleamic acid. Where $R^7 \neq R^1$, divinyl compounds, such as, for example, polydimethylsiloxane bis(propylmaleamic acid) or polydimethylsiloxanebis(dipropyleneaminomaleamic acid), are present.

A suitable further vinylic polysiloxane compound is a preferred derivative corresponding to the Formula IX

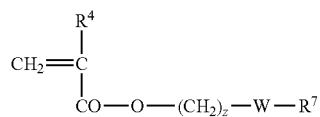

IX where z may be from 0 to 4 and $R^4$ or W have the abovementioned meaning. $R^7$ may be either $R^1$ or

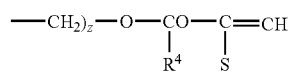

where S is preferably hydrogen. Examples of such monovinylic compounds ($R^7$=$R^1$) are polydimethylsiloxane-(1-propyl-3-acrylate) or polydimethylsiloxane-(1-propyl-3-methacrylate).

Where $R^7 \neq R^1$, divinyl compounds, such as, for example, polydimethylsiloxanebis-(1-propyl-3-acrylate) or polydimethylsiloxanebis-(1-propyl-3-methacrylate), are present.

Derivatives corresponding to the Formula X

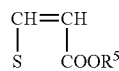

X where S is COOM$_a$ or —COOR$^5$ and $R^5$ may be an aliphatic hydrocarbon radical having 3 to 20 C atoms, a cycloaliphatic hydrocarbon radical having 5 to 8 C atoms and an aryl radical having 6 to 14 C atoms, are preferably used as the vinylic ester compound in the context of the present invention. Examples of such ester compounds are di-n-butyl maleate or fumarate or mono-n-butyl maleate or fumarate.

Furthermore, compounds corresponding to the Formula XI

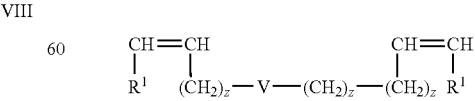

XI where z may once again be from 0 to 4 and $R^1$ has the meaning already known, can also be used. Here, V may be W (i.e. a polydimethylsiloxane group), which corresponds to a dialkenylpolydimethylsiloxane compound, such as, for example, divinylpolydimethylsiloxane. As an alternative to this, V may also be —O—CO—C$_6$H$_4$—CO—O—. These compounds are dialkenylphthalic acid derivatives. A typical example of such phthalic acid derivatives is diallyl phthalate.

The molecular weights of the compounds which form the structural group c) can be varied within wide limits and are preferably from 150 to 10 000.

Furthermore, up to 50 mol %, in particular up to 20 mol %, based on the monomers having the structural groups according to the Formulae II, III and IV, of a vinyl, acrylic acid or methacrylic acid derivative can also be incorporated in the form of polymerized units. A preferably used monomeric vinyl derivative is styrene, ethylene, propylene, isobutene or vinyl acetate, a preferably used monomeric acrylic acid derivative is acrylic acid or methyl acrylate, while finally methacrylic acid methyl methacrylate and hydroxyethyl methacrylate are preferably used as monomeric methacrylic acid derivatives.

The abovementioned copolymers are disclosed in EP-A-736553.

The dispersion according to the invention may furthermore contain a copolymer whose basis is an oxyalkenyl glycol (meth)acrylic acid ester and the copolymer contains the following structural groups:

5-98% by weight of a monomer of the type (a) (alkoxy) polyalkylene glycol mono(meth)acrylic esters of the general Formula XV

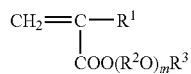

XV in which
R$^1$ is a hydrogen atom or the methyl group,
R$^2$O is a class or a mixture of two or more classes of an oxyalkylene group having 2-4 carbon atoms, with the proviso that two or more classes of the mixture may be added either in the form of a block or in random form,
R$^3$ is a hydrogen atom or an alkyl group having 1 to 5 carbon atoms and
m is a value which is the average number of added moles of oxyalkylene groups, m being an integer in the range from 1 to 200.

From 95 to 2% by weight of a monomer of the (meth) acrylic acid type (b) of the general Formula XVI

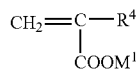

XVI in which
R$^4$ is a hydrogen atom or the methyl group and M$^1$ is a hydrogen atom, a monovalent metal atom, a divalent metal atom, an ammonium group or an organic amine group,
and from 0 to 50% by weight of another monomer (c) which is copolymerizable with these monomers, with the proviso that the total amount of (a), (b) and (c) is 100% by weight.

Typical monomers (a) are:
hydroxyethyl(meth)acrylate,
hydroxypropyl(meth)acrylate,
polyethylene glycol mono(meth)acrylate,
polypropylene glycol mono(meth)acrylate,
polybutylene glycol mono(meth)acrylate,
polyethylene glycol polypropylene glycol mono(meth)acrylate, polyethylene glycol polybutylene glycol mono(meth) acrylate,
polypropylene glycol polybutylene glycol mono(meth)acrylate, polyethylene glycol polypropylene glycol polybutylene glycol mono(meth)acrylate,
methoxypolyethylene glycol mono(meth)acrylate,
methoxypolypropylene glycol mono(meth)acrylate,
methoxypolybutylene glycol mono(meth)acrylate,
methoxypolyethylene glycol polypropylene glycol mono (meth)acrylate,
methoxypolyethylene glycol polybutylene glycol mono (meth)acrylate,
methoxypolypropylene glycol polybutylene glycol mono (meth)acrylate,
methoxypolyethylene glycol polypropylene glycol polybutylene glycol mono(meth)acrylate,
ethoxypolyethylene glycol mono(meth)acrylate,
ethoxypolypropylene glycol mono(meth)acrylate,
ethoxypolybutylene glycol mono(meth)acrylate,
ethoxypolyethylene glycol polypropylene glycol mono (meth)acrylate,
ethoxypolyethylene glycol polybutylene glycol mono(meth) acrylate,
ethoxypolypropylene glycol polybutylene glycol mono (meth)acrylate and/or
ethoxypolyethylene glycol polypropylene glycol polybutylene glycol mono(meth)acrylate.

Typical monomers (b) are: acrylic acid and methacrylic acid, mono- and divalent metal salts, ammonium salts and/or organic amine salts thereof.

Typical monomers (c) are: esters of aliphatic alcohols having 1 to 20 C atoms with (meth)acrylic acid; unsaturated dicarboxylic acids, such as maleic acid, fumaric acid, citraconic acid, mono- and divalent metal salts, ammonium salts and/or organic amine salts thereof; mono- or diesters of unsaturated dicarboxylic acids, such as maleic acid, fumaric acid, citraconic acid, with aliphatic alcohols of 1 to 20 C atoms, with glycols having 2 to 4 C atoms, with (alkoxy)polyalkylene glycols of 2 to 100 added moles of the abovementioned glycols; unsaturated amides, such as (meth)acrylamide and alkyl(meth)acrylamide; vinyl esters, such as vinyl acetate and vinyl propionate; aromatic vinyl compounds, such as styrene; unsaturated sulfonic acids, such as (meth)allylsulfonic acid, sulfoethyl(meth)acrylate, 2-methylpropanesulfonic acid (meth)acrylamide, styrenesulfonic acid, mono- and divalent metal salts, ammonium salts and/or organic amine salts thereof.

The dispersions according to the invention can be prepared by a process in which
a) a superplasticizer in the form of a powder or as an aqueous solution of the superplasticizer is added with stirring to an aqueous starting dispersion of silica in which the aggregates and/or agglomerates have a median diameter of less than 1 μm and a BET surface area greater than 50 m$^2$/g, and optionally further dilution is effected with water or
b) a precipitated silica powder is dispersed in an aqueous solution of a superplasticizer by means of a suitable dispersing unit and subsequently optionally further diluted with water or
c) the silica powder is dispersed in an aqueous phase, preferably in water, and the resulting dispersion is then added to an aqueous solution of the superplasticizer. The mixing in of the dispersion can be effected in this case with very low shearing energy, for example by means of a propeller stirrer.

A polycarboxylate ether is preferably used as a superplasticizer for the preparation of the dispersions.

For the preparation of the silica dispersion used in the abovementioned steps a) to c), it may be advantageous first to prepare a predispersion. In a preferred embodiment, silica particles are dispersed in a liquid component, preferably water, particularly preferably deionized water, for this purpose. However, it is also possible to redisperse a filter cake, i.e. not to dry the silica particles first. This second embodiment is of course associated with economic advantages compared with the first embodiment. Any mixed forms of these two embodiments are likewise possible, i.e. it is possible to redisperse a filter cake and then to add dried silica, and vice versa. It is also possible to prepare base dispersions of mixtures of at least two different silicas.

The predispersions are prepared in a manner known per se by means of suitable dispersing units. Thus, the dispersing of the silica powder can be carried out in apparatuses which introduce a comparatively low shear energy into the system (e.g. dissolvers, rotor-stator systems). However, it is also possible to use the same units which are used for preparing the actual dispersion.

The pH of the predispersion or the dispersion can be adjusted in an optional further step to the desired value, i.e. a value of from 8.0 to 12, particularly preferably from 8.5 to 12, very particularly preferably from 8.7 to 10 and especially preferably from 9 to 9.5. This can be effected by addition of a basic component or of an acidifying agent, depending on the pH of the silica. In principle, any basic agent may be used, preferably an alkali metal or alkali earth metal hydroxide or organic bases or ammonia. In principle, any acidic agent can also be used as the acidifying agent, e.g. mineral acids or organic acids.

According to a process variant, it is also possible to use silica whose pH has already been adjusted so that the silica itself adjusts the pH of the dispersion to the desired value. In this variant, the pH of the silica can be adjusted in one of the steps for the preparation of the silica, for example during the precipitation or during the drying, by addition of suitable basic or acidic agents. In this regard, suitable techniques are known to the person skilled in the art.

For the preparation of the dispersion, the silica to be dispersed and brought into contact with the liquid phase or the predispersion whose pH was optionally adjusted accordingly is comminuted by means of a suitable unit.

In principle, any suitable dispersing unit can be used. Thus, for example, dispersing units whose energy input is sufficient to disperse the silica powder or the filter cake so that the agglomerates have a median particle size of less than 1 μm after the dispersing are suitable. Specific energy inputs of from 0.1 to 10 kWh/kg are required for this purpose, depending on the solid. In order to realize these high specific energy inputs, it is possible in principle to use methods with a high power density and short residence time, methods with a low power density and long residence time and intermediate forms.

High-pressure systems, such as, for example, nanomizers, microfluidizers and other nozzle systems in which the dispersion flows through a nozzle under high pressure of up to 50 to 5000 bar and is dispersed in and after the nozzle as a result of the energy dissipation, achieve very high energy inputs of as much as 5000 kJ/m$^3$ to 500 000 kJ/m$^3$ in a single pass. Stirred ball mills on the other hand lead to substantially lower specific energy inputs of from 5 to 500 kJ/m$^3$ per pass. In order to achieve sufficient particle finenesses, the dispersion must pass through the mill considerably more frequently, which leads to substantially higher stress frequencies than in high-pressure systems. The great stress frequency at low intensity has a positive effect on the structure and the surface of the particles and hence the stability of the dispersion.

In order to achieve high degrees of filling and to obtain a stable dispersion having a low viscosity, advantageously shear energies of >1000 kJ/m$^3$ should be applied. Particularly good results are obtained using stirred ball mills, high-pressure homogenizers or planetary ball mills. The operation of these mills is known to the person skilled in the art.

The use of ball mills, in particular stirred ball mills, proved to be particularly advantageous. The product flow through the mill can be effected by the pendulum procedure or by the circulation procedure. Owing to the large numbers of circulations, an arrangement in the circulation procedure is simpler to realize here. The circulation rate may vary from 10 to 300 kg/h and is advantageously in the range from 25 to 200 kg/h, particularly preferably in the range of 50-150 kg/h and particularly preferably in the range 80-120 kg/h.

The stirrer may be in the form of disks, pins, pin-counterpin arrangements, an annular gap or the like. A disk arrangement is preferred. The duration of milling is from 10 min to 80 hours, preferably from 0.5 to 50 hours, particularly preferably from 1 to 25 hours and especially preferably from 5 to 15 hours, depending on the dispersability of the product and the amount used. This makes it possible to achieve specific energy inputs (based on kg of dispersion) of from 0.01 to 10 kWh/kg. Energy inputs of from 0.05 to 5 kWh/kg, particularly preferably from 0.1 to 1 kWh/kg, very particularly preferably from 0.1 to 0.5 kWh/kg and especially preferably from 0.25 to 0.3 kWh/kg are preferred. The grinding media may consist of glass, alumina or zirconium oxide or of further inorganic oxides and various mixtures of inorganic oxides. Owing to the high density, the use of zirconium oxide grinding media which are stabilized to abrasion by means of yttrium oxide is advantageous. The size of the grinding media may vary from 20 to a few mm, and grinding media having a size of from 0.02 to 10 mm, particularly preferably from 0.05 to 5 mm, very particularly preferably from 0.1 to 1 mm and especially preferably from 0.2-0.4 mm are advantageously used. The degree of filling of the grinding media, based on the free volume of the grinding space, may vary from 60 to 99%, preferably 70-95%, particularly preferably from 80 to 95% and especially preferably from 90 to 95%. The circumferential speed of the grinding tool may vary from 1 m/s to 15 m/s, preferably from 5 m/s to 15 m/s, particularly preferably from 8 m/s to 12 m/s.

After the milling, concentration of the dispersion to the desired silica content is optionally effected. This concentration can be effected by any technique known to the person skilled in the art, for example by reduction of the liquid medium, for example by vacuum vaporization, cross-flow filtration, continuous or batchwise centrifuging, filtration or by increasing the solids content.

If it is intended to achieve low degrees of filling, the dispersing of the silica powder can also be carried out in apparatuses which introduce comparatively little shear energy into the system (e.g. dissolvers, rotor-stator systems).

Determination of the Particle Size Distribution

The particle distribution of the dispersions according to the invention is determined according to the laser diffraction principle on a laser diffractometer (from Horiba, LA-920). The particle distribution corresponds to the particle distribution of all particles present in the dispersion.

First, a sample of the silica dispersion is taken with stirring, transferred to a beaker and diluted by addition of water without addition of dispersing additives so that a dispersion having a proportion by weight of about 1% by weight of SiO$_2$ forms. Immediately after the dispersing, the particle size distribution of a partial sample of the dispersion is determined using the laser diffractometer (Horiba LA-920 with standard apparatus software). A relative refractive index of 1.09 should be chosen for the measurement.

All measurements are effected at 23° C. The particle size distribution and the relevant parameters, such as, for example, the median particle size $d_{50}$, are automatically calculated by the apparatus and displayed as a graph. The information in the operating instructions should be followed.

Determination of the BET Surface Area

If the silica is present not as a solid but in an aqueous dispersion, the following sample preparation should be carried out prior to the determination of the BET surface area:

100 ml of the silica dispersion are taken with stirring, transferred to a porcelain dish and dried for 72 h at 105° C. In order to remove organic constituents, the dried silica is heated to 500° C. for 24 h. After the silica sample has cooled, it is comminuted with a spatula and the BET surface area is determined.

The BET surface area of silica as a solid is determined on the basis of ISO 5794-1/Annex D using the TRISTAR 3000 apparatus (from Micromeritics) by the multipoint determination according to DIN ISP 9277.

Determination of the pH of the Dispersion

The pH of the aqueous dispersions is on the basis of DIN EN ISO 787-9 at 20° C. For determining the pH, the dispersions are diluted with water to a proportion by weight of 5% $SiO_2$.

Determination of the DBP Absorption

The DBP absorption (DBP number), which is a measure of the absorptivity of the precipitated silica, is determined on the basis of the standard DIN 53601, as follows:

12.50 g of pulverulent or spherical silica having a moisture content of 0-10% (if appropriate, the moisture content is established by drying at 105° C. in a drying oven) are introduced into the kneader chamber (article number 279061) of the Brabender absorptometer "E" (without damping of the exit filter of the torque transducer). With constant mixing (circumferential speed of the kneader blades 125 rpm), dibutyl phthalate is added dropwise at room temperature at a rate of 4 ml/min to the mixture through the "Brabender T 90/50 Dosimat". Mixing in is effected with only a low required force and is monitored by means of the digital display. Toward the end of the determination, the mixture becomes pasty, which is indicated by means of a steep increase in the required force. At a display of 600 digits (torque of 0.6 Nm), both the kneader and the DBP metering are switched off by an electrical contact. The synchronous motor for the DBP feed is coupled to a digital counter, so that the consumption of DBP in $m^1$ can be read.

The DBP absorption is stated in g/(100 g) and calculated using the following formula:

$$DBP = \frac{V \cdot D \cdot 100}{E} \cdot \frac{g}{100\ g} + K$$

where
DBP=DBP absorption in g/(100 g)
V=consumption of DEP in ml
D=density of DBP in g/ml (1.047 g/ml at 20° C.)
E=weight of silica taken in g
K=correction value according to moisture correction table in g/(100 g)

The DBP absorption is defined for the anhydrous, dried silica. With the use of moist precipitated silicas, the correction value K should be taken into account for calculating the DBP absorption. This value can be determined using the following correction table; for example, a 5.8% water content of the silica would mean an additional 33 g/(100 g) for the DBP absorption. The moisture of the silica is determined according to the method "determination of the moisture and of the loss on drying".

Moisture correction table for dibutyl phthalate absorption (anhydrous)

| %        | .% Moisture |    |    |    |    |
|----------|----|----|----|----|----|
| Moisture | .0 | .2 | .4 | .6 | .8 |
| 0        | 0  | 2  | 4  | 5  | 7  |
| 1        | 9  | 10 | 12 | 13 | 15 |
| 2        | 16 | 18 | 19 | 20 | 22 |
| 3        | 23 | 24 | 26 | 27 | 28 |
| 4        | 28 | 29 | 29 | 30 | 31 |
| 5        | 31 | 32 | 32 | 33 | 33 |
| 6        | 34 | 34 | 35 | 35 | 36 |
| 7        | 36 | 37 | 38 | 38 | 39 |
| 8        | 39 | 40 | 40 | 41 | 41 |
| 9        | 42 | 43 | 43 | 44 | 44 |
| 10       | 45 | 45 | 46 | 46 | 47 |

Determination of the Moisture or the Loss on Drying

The moisture of silica is determined according to ISO 787-2 after drying for 2 hours in a circulation drying oven at 105° C. This loss on drying predominantly comprises water moisture.

Determination of the Loss on Ignition

According to this method, the loss of weight of silica is determined on the basis of DIN EN ISO 3262-1 at 1000° C. At this temperature, physically and chemically bound water and other volatile constituents escape. The moisture (LD) of the sample investigated is determined by the above-described method "determination of the moisture or of the loss on drying" according to DIN EN ISO 787-2.

Determination of the Al and Na Content

The determination of the Al content is effected as $Al_2O_3$, and that of the Na content as $Na_2O$. Both determinations are carried out according to ISO 3262-18 by means of flame atomic adsorption spectroscopy.

Determination of the $SiO_2$ Content

The determination of the $SiO_2$ content is effected according to ISO 3262-19.

EXAMPLES 1-3

Preparation of the Dispersions

The characteristics of the silicas used for the preparation of the dispersions are stated in Table 1.

The dispersions are prepared in a stirred ball mill (LME 4, from Netzsch). The grinding chamber and the disk stirrer consist of abrasion-resistant ceramic ($Al_2O_3$ or $ZrO_2$). The grinding balls comprising yttrium-stabilized $ZrO_2$ have a diameter of from 0.2 to 0.4 mm and fill 900 of the grinding chamber (8.84 kg). For predispersing, 22.5 kg of demineralized water are initially taken in a 50 l container with a bottom outlet. 2.5 kg of silica are then gradually stirred in by means of a dissolver disk (speed=380-940 rpm; circumferential speed=3-7.4 m/s) until the silica is dispersed in the liquid. The pH of the dispersion is then adjusted to 9 with KOH. The pH is checked regularly and if necessary regulated. In order to achieve the desired fineness, the dispersion is circulated through the ball mill. In all experiments, the circumferential speed remains constant at 10 m/s and the throughput remains constant at about 100 kg/h.

By addition of further silica in portions to the container with the initially taken mixture, the $SiO_2$ concentration of the dispersion is further increased. During this procedure, the mill continues to operate with circulation. When the desired $SiO_2$— concentration is reached, the dispersion is transferred to a container and the superplasticizer (polycarboxylate ether (PCE) according to EP-A-1189955, example 2), in the form of an aqueous solution (PCE content=45% by weight), is stirred in at room temperature. The ratio of PCE to silica is adjusted according to Table 2.

The composition of the dispersions is shown in Table 2. The comparative example contains no silica but only PCE and is not a dispersion.

The dispersions according to the invention show no significant change with respect to sedimentation stability and viscosity within a period of 6 months.

EXAMPLE 4

Testing of the Forms Characteristics

The preparation of standard mortar and the testing of the strength were effected according to DIN EN 196-1. For the preparation of the mortar, cement of the designation CEM I 52.5 Mergelstetten is used. The mortar is prepared at 20° C. The dispersions corresponding to a silica content of 0.5% by weight, based on the cement weight, are added to the mortar mixes. The water/cement ratio is always 0.4.

Test specimens measuring 40 mm×40 mm×160 mm are produced from the mortar according to DIN 196-1. The determination of the bending tensile strength and of the compressive strength after ageing of the test specimens for 8 h is effected on these test specimens on the basis of this standard.

TABLE 1

| Test parameter | Unit | Example 1 | Example 2 | Example 3 | Measuring method |
|---|---|---|---|---|---|
| BET surface area | m²/g | 165 | 270 | 85 | Areameter, ISO 5794-1/Annex D |
| Median particle size $d_{50}$ | μm | 11 | 13 | 7.5 | Laser diffraction based on ISO 13320-1 |
| Tamped density | g/l | 80 | 180 | 300 | Not screened, based on ISO 787-11 |
| Loss on drying | % by weight | 4 | 5 | 6 | 2 h at 105° C., based on ISO 787-2 |
| Loss on ignition | % by weight | 3 | 4 | 8 | 2 h at 1000° C., based on ISO 3262-1 |
| pH | | 5.5 | 6 | 10.1 | 5% in water, based on ISO 787-9 |
| DBP absorption | g/100 g | 250 | 250 | 200 | Relative to anhydrous substance, based on DIN 53601 |
| $SiO_2$ content | % by weight | 99.4 | 99.5 | 82 | Based on ISO 3262-19 |
| Al content as $Al_2O_3$ | % by weight | — | — | 9.5 | Based on ISO 3262-18 |
| Na content as $Na_2O$ | % by weight | 0.3 | 0.2 | 8 | Based on ISO 3262-18 |

TABLE 2

| | Parameter | Unit | Example 1 | Example 2 | Example 3 | Comparative example |
|---|---|---|---|---|---|---|
| Dispersion before addition of PCE | Silica used | | Silica 1 | Silica 2 | Silica 3 | — |
| | $SiO_2$ content | % by weight | 33.4 | 22.4 | 40.7 | — |
| | Median particle size $d_{50}$ | nm | 200 | 186 | 310 | — |
| | pH | — | 9 | 9 | 9 | — |
| Dispersion after addition of PCE | Final $SiO_2$ content | % by weight | 33.4 | 22.4 | 40.7 | 0 |
| | PCE content | % by weight | 10.0 | 7.8 | 11.0 | 30 |
| | BET surface area | m²/g | 131 | 199 | 91 | — |
| | Median particle size $d_{50}$ | nm | 200 | 186 | 310 | — |
| | PCE/$SiO_2$ | — | | 0.30 | 0.35 | 0.27 | — |
| | pH | — | 9 | 9 | 9 | 7 |

The results are summarized in Table 3.

TABLE 3

Strength development of mortar prisms in the presence of various dispersions of precipitated silica (dose in each case 0.5%, based on the cement weight); water/cement ratio = 0.4; SL = Initial slump; BTS = Bending tensile strength in $N/mm^2$; CS = Compressive strength in $N/mm^2$

| Additive | Dose MVA2500 | SL in cm | BTS 8 h in $N/mm^2$ | CS 8 h in $N/mm^2$ |
|---|---|---|---|---|
| Dispersion from example 1 | 0.15% | 24.1 | 3.91 | 15.59 |
| Dispersion from example 2 | 0.175% | 24.8 | 3.85 | 17 |
| Dispersion from example 3 | 0.135 | 24.2 | 3.68 | 14.97 |
| Comparative example 1 (only PCE without silica) | 0.125% | 24.8 | 2.796 | 10.227 |
| Comparative example 2 (silica according to example 3 but not in the form of a dispersion but as a powder, i.e. added in dry form) | 0.14% | 25.1 | 3.52 | 13.41 |

The results obtained show a substantial increase in the early strength (measured as bending tensile strength after 8 h and compressive strength after 8 h) with the use of the dispersions according to the invention. Also interesting is that the dispersion 2 is more effective than the identical silica in dry form.

Furthermore, experiments are carried out in a calorimeter. The cement used is CEM I42.5 Bernburg. The dispersions of example 1 to example 3 according to the invention are used. The dispersions are metered so that the proportion of silica is 0.5% by weight, based on the cement used. The water/cement ratio is constant at 0.5 The comparison is made against comparative example 1 which contains no silica but PCE. In all experiments, the initial slump was 24+/−1 cm.

The curves obtained (FIG. 1) show the energy liberated in [W/g CEM] as a function of time [h] in the cement paste test specimen. The evolution of heat is due to the exothermic reaction of the silicate phases in the cement with water. The maximum of the curve obtained by calorimetry can be correlated with the strength development in the cement, i.e. a maximum occurring at an earlier time means an earlier development of early strength in the component.

The position of the maxima of the curves from FIG. 1 on the time axis are summarized in Table 4 below:

TABLE 4

| | Dispersion according to example 1 | Dispersion according to example 2 | Dispersion according to example 3 | Comparative example 1 |
|---|---|---|---|---|
| Position of the maximum of the evolution of heat on the time axis | 9.0 h | 8.8 h | 9.2 h | 10 h |

From the results, it is possible to conclude that the use of the dispersions according to the invention results in a substantial acceleration of the cement hydration. The beginning of the silicate hydration and the maximum of the evolution of heat are 8-12% earlier than in the case of comparative example 1.

The invention claimed is:

1. A dispersion, comprising,
water,
at least one precipitated silica, at least one silicate, or a combination thereof and
at least one superplasticizer,
wherein
the superplasticizer is a water soluble polycarboxylate ether,
a BET surface area of the at least one precipitated silica, at least one silicate, or a combination thereof is greater than 50 $m^2/g$,
the precipitated silica, silicate, or combination thereof is in the form of aggregates, agglomerates or combination thereof,
a media diameter of the aggregates, agglomerates or combination thereof is less than 1 μm;
the proportion of silica is from 5 to 50% by weight, based on the total amount of the dispersion, and
the dispersion is free of inorganic dispersants and latex, and the superplasticizer/silica weight ratio is from 1/100 to 100/1.

2. The dispersion as claimed in claim 1, wherein the dispersion is free of binders.

3. The dispersion as claimed in claim 1, wherein the the median diameter of the aggregates, agglomerates, or combination thereof is from 50 to 750 nm.

4. The dispersion as claimed in claim 1, wherein the proportion of silica is from 10 to 50% by weight, based on the total amount of the dispersion.

5. The dispersion as claimed in claim 1, wherein a pH of the dispersion is from 8 to 12.

6. The dispersion as claimed in claim 1, wherein the polycarboxylate ether is a copolymer of oxyalkylene glycol alkenyl ethers and the copolymer comprises:
a) from 51 to 95 mol % of at least one structural group of Formula Ia, Ib, and Ic

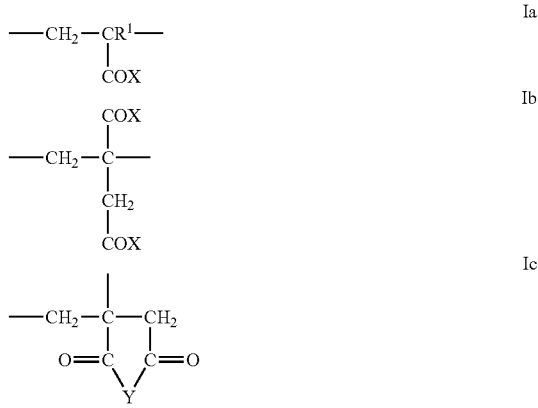

wherein
$R^1$ is hydrogen or an aliphatic hydrocarbon radical having 1 to 20 C atoms,
X is $-OM_a$, $-O-(C_mH_{2m}O)_n-R^2$, $-NH-(C_mH_{2m}O)_n-R^2$,
M is hydrogen, a monovalent metal cation, a divalent metal cation, an ammonium ion or an organic amine radical,
a is ½ or 1,
$R^2$ is hydrogen, an aliphatic hydrocarbon radical having 1 to 20 C atoms, a cycloaliphatic hydrocarbon radical having 5 to 8 C atoms, an aryl radical having 6 to 14 C atoms, or a substituted aryl radical having 6 to 14 C atoms, Y is O or $NR^2$, m is from 2 to 4, and n is from 0 to 200, b) from 1 to 48.9 mol % of a structural group of Formula II

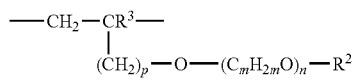

II wherein $R^3$ is hydrogen or an aliphatic hydrocarbon radical having 1 to 5 C atoms, p is from 0 to 3, and $R^2$, m and n as described above, c) from 0.1 to 5 mol % of structural groups of Formula IIIa or IIIb

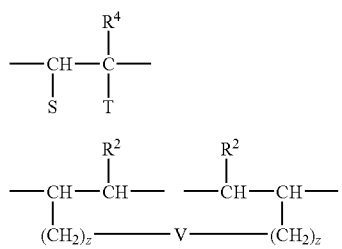

IIIa

IIIb wherein

S is —H, —$COOM_a$, or —$COOR^5$,

T is —$U^1$—(CH($CH_3$)—$CH_2$—O)$_x$—($CH_2$—$CH_2$—O)$_y$—$R^6$, —W—$R^7$, —CO—[NH—($CH_2$)$_3$]$_s$—W—$R^7$, —CO—O—($CH_2$)$_z$—W—$R^7$, or —($CH_2$)$_z$—V—($CH_2$)$_z$—CH=CH—$R^2$, with the proviso that when S is —$COOR^5$ or $COOM_a$ T is —$COOR^5$, $U^1$ is —CO—NH—, —O—, or —$CH_2$O—, $U^2$ is —NH—CO—, —O—, or —$OCH_2$—, V is —O—CO—$C_6H_4$—CO—O— or —W—, wherein

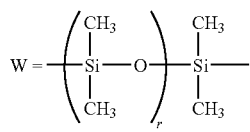

$R^4$ is H, or $CH_3$, $R^5$ is an aliphatic hydrocarbon radical having 3 to 20 carbon atoms, a cycloaliphatic hydrocarbon radical having 5 to 8 C atoms or an aryl radical having 6 to 14 C atoms, $R^6$ is $R^2$, or

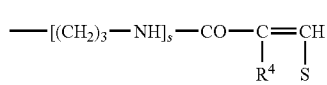

$R^7$ is $R^2$, or

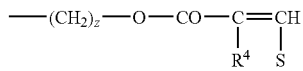

r is from 2 to 100, s is 1 or 2, z is from 0 to 4, x is from 1 to 150, y is from 0 to 15, and d) from 0 to 47.9 mol of at least one structural group of Formula IVa and IVb

IVa

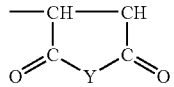

IVb wherein, M, X and Y are described above.

7. The dispersion as claimed in claim 1, wherein the polycarboxylate ether is a copolymer of an oxyalkenyl glycol alkenyl ether and the copolymer comprises:

a) from 10 to 90 mol % of at least one structural group of Formula IVa and IVb

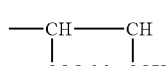

IVa

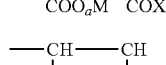

IVb wherein

M is hydrogen, a monovalent or a divalent metal cation, an ammonium ion or an organic amine radical, a is 1 or, when M is a divalent metal cation, is ½, X is —$OM_a$ or —O—($C_mH_{2m}$O)$_n$—$R^1$ with $R^1$=H, an aliphatic hydrocarbon radical having 1 to 20 carbon atoms, a cycloaliphatic hydrocarbon radical having 5 to 8 C atoms, an aryl radical having 6 to 14 C atoms, or a substituted aryl radical having 6 to 14 C atoms, wherein m is from 2 to 4, and n is from 0 to 200, —$NHR^2$ or —$NR^2_2$ with $R^2$=H, an aliphatic hydrocarbon radical having 1 to 20 carbon atoms, a cycloaliphatic hydrocarbon radical having 5 to 8 C atoms, an aryl radical having 6 to 14 C atoms, or a substituted aryl radical having 6 to 14 C atoms, wherein m is from 2 to 4, and n is from 0 to 200, and —CO—$NH_2$ and Y is O, or $NR_2$, b) from 1 to 89 mol % of structural groups of Formula II

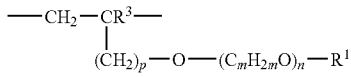 II wherein
R$^3$ is H, or aliphatic hydrocarbon radical having 1 to 5 C atoms,
p is from 0 to 3, and R$^1$, m, n are as described above, and
c) from 0.1 to 10 mol % of structural groups of Formula IIIa or IIIb

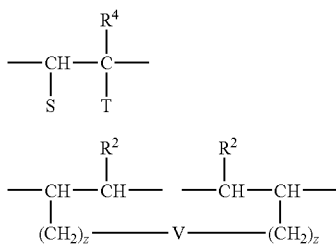

wherein
S is —H, —OOM$_a$, or —COOR$^5$,

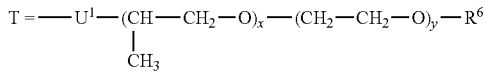

—W—R$^7$, —CO—[NH—(CH$_2$)$_3$]$_s$—W—R$^7$, —CO—O—(CH$_2$)$_z$—W—R$^7$, or
—(CH$_2$)$_z$—V—(CH$_2$)$_z$—CH=CH—R$^1$,
with the proviso that T is —COOR$^5$ where S is —COOR$^5$ or COOM$_a$,
U$^1$ is —CO—NH—, —O— or —CH$_2$O—,
U$^2$ is —NH—CO—, —O—, or —OCH$_2$,
V is —O—CO—C$_6$H$_4$—CO—O— or —W—, wherein W is

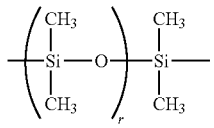

R$^4$ is H, or CH$_3$,
R$^5$ is an aliphatic hydrocarbon radical having 3 to 20 C atoms, a cycloaliphatic hydrocarbon radical having 5 to 8 C atoms, an aryl radical having 6 to 14 C atoms,
R$^6$ is R$^1$,

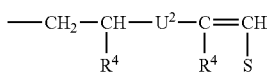

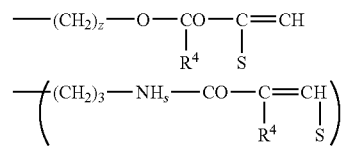

r is from 2 to 100;
s is 1 or 2;
z is from 0 to 4;
x is from 1 to 150;
y is from 0 to 15.

8. The dispersion as claimed in claim 1, wherein the copolymer is an oxyalkenyl glycol (meth)acrylic ester and the copolymer comprises:
from 5-98% by weight of a monomer of:
(a) (alkoxy)polyalkylene glycol mono(meth)acrylic ester of Formula XV

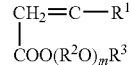 XV wherein
R$^1$ is a hydrogen atom or methyl group,
R$^2$O is an oxyalkylene group having 2-4 carbon atoms or a mixture of oxyalkylene groups, with the proviso that the mixture may be in the form of a block or in random form,
R$^3$ is a hydrogen atom or an alkyl group having 1 to 5 carbon atoms, and
m is an integer in the range from 1 to 200;
from 95 to 2% by weight of a monomer of a (meth) acrylic acid (b) of Formula XVI

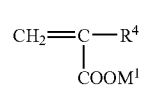 XVI wherein
R$^4$ is a hydrogen atom or the methyl group and M$^1$ is a hydrogen atom, a monovalent metal atom, a divalent metal atom, an ammonium group or an organic amine group; and
from 0 to 50% by weight of another monomer (c) which is copolymerizable with these monomers; with the proviso that a total amount of (a), (b) and (c) is 100% by weight.

9. A dispersion, comprising,
water,
at least one precipitated silica, at least one silicate, or a combination thereof and at least one superplasticizer,
wherein the superplasticizer is a water-soluble polycarboxylate ether,
a BET surface area of the at least one precipitated silica, at least one silicate, or a combination thereof is greater than 50 m$^2$/g,
the precipitated silica, silicate, or combination thereof is in the form of aggregates, agglomerates or combination thereof,
a median diameter of the aggregates, agglomerates or combination thereof is less than 1 μm, the proportion of silica in the dispersion is from 20 to 50% by weight, based on the total amount of the dispersion, a superplasticizer/silica ratio is from 1/100 to 100/1, and the dispersion is free of inorganic dispersants and latex.

10. A dispersion, comprising, water, at least one precipitated silica, at least one silicate, or a combination thereof and at least one superplasticizer, wherein the superplasticizer is a water-soluble polycarboxylate ether, a BET surface area of the at least one precipitated silica, at least one silicate, or a combination thereof is greater than 50 $m^2/g$, the precipitated silica, silicate, or combination thereof is in the form of aggregates, agglomerates or combination thereof, a median diameter of the aggregates, agglomerates or combination thereof less than 1 μm, the proportion of silica in the dispersion is from 20 to 50% by weight, based on the total amount of the dispersion, a content of superplasticizer is from 7.8 to 11% by weight based on the weight of the dispersion, and the dispersion is free of inorganic dispersants and latex.

* * * * *